United States Patent [19]

Holowko et al.

[11] Patent Number: 5,440,398
[45] Date of Patent: Aug. 8, 1995

[54] ERROR DETECTION APPARATUS AND METHOD FOR USE WITH ENGRAVERS

[75] Inventors: Paul L. Holowko, Spring Valley; David R. Seitz, Vandalia; Curtis Woods, Centerville, all of Ohio

[73] Assignee: Ohio Electronic Engravers, Inc., Dayton, Ohio

[21] Appl. No.: 125,938

[22] Filed: Sep. 23, 1993

Related U.S. Application Data

[63] Continuation-in-part of Ser. No. 38,679, Mar. 26, 1993, abandoned, which is a continuation-in-part of Ser. No. 22,127, Feb. 25, 1993, abandoned.

[51] Int. Cl.⁶ .................................................. B41C 1/02
[52] U.S. Cl. ...................................................... 358/299
[58] Field of Search ................... 358/299; 356/378, 379

[56] References Cited

U.S. PATENT DOCUMENTS

| | | | |
|---|---|---|---|
| 2,493,628 | 1/1950 | Harley | 88/14 |
| 2,777,058 | 1/1957 | Boyajean | 250/27 |
| 2,874,479 | 2/1959 | Farber | 33/185 |
| 2,943,564 | 7/1960 | Demer | 101/93 |
| 3,612,753 | 10/1971 | Xorman | 178/5.2 A |
| 3,652,992 | 3/1972 | Koll | 340/146 |
| 3,876,829 | 4/1975 | Schreiber | 178/7.3 D |
| 3,904,816 | 9/1975 | Taudt et al. | 178/6 |
| 3,931,570 | 1/1976 | George et al. | 324/34 R |
| 3,956,583 | 5/1976 | Pugsley | 178/6.6 R |
| 4,001,495 | 1/1977 | Tauszig | 358/294 |
| 4,012,584 | 3/1977 | Gascoigne | 358/302 |
| 4,052,739 | 10/1977 | Wada et al. | 358/299 |
| 4,072,928 | 2/1978 | Wilder | 340/146.3 H |
| 4,075,662 | 2/1978 | Gall | 358/280 |
| 4,240,118 | 12/1980 | Wellendorf et al. | 358/296 |
| 4,315,285 | 2/1982 | Sommer et al. | 358/280 |
| 4,342,050 | 7/1982 | Traino | 358/256 |
| 4,363,037 | 12/1982 | Taudt | 358/296 |
| 4,394,693 | 7/1983 | Shirley | 358/298 |
| 4,437,122 | 3/1984 | Walsh et al. | 358/166 |
| 4,451,856 | 5/1984 | Buechler | 358/299 |
| 4,503,468 | 3/1985 | Serinken et al. | 358/256 |
| 4,612,584 | 9/1986 | George et al. | 358/299 |
| 4,683,499 | 7/1987 | Kuwabara | 358/264 |
| 4,683,500 | 7/1987 | Kitamura et al. | 358/280 |
| 4,691,229 | 9/1987 | Colditz et al. | 358/76 |
| 4,691,238 | 9/1987 | Yamada | 358/280 |
| 4,700,235 | 10/1987 | Gall | 358/283 |
| 4,944,593 | 7/1990 | Kalstroem et al. | 356/379 |
| 5,029,011 | 7/1991 | Fraser | 358/299 |
| 5,229,861 | 7/1993 | Nozaka et al. | 358/299 |
| 5,293,426 | 3/1994 | Wouch et al. | 358/299 X |

OTHER PUBLICATIONS

"Numerical Recipes in C The Art of Scientific Computing", William H. Press, Brian P. Flannery, Saul A. Teukolsky and William T. Vetterling; pp. 452–460 (1988).
"Numerical Analysis: A Practical Approach", Melvin J. Maron p. 188 (no date).
"The Image Processing Handbook", John C. Russ, pp. 105–113, (1992).
"Datwyler", Max Daetwyler Corporation, 13420 West Reese Blvd., Huntersville, N.C. 28078, undated brochure.
"Twin-Pilot", Maschinenfabrik Kaspar Walter GmbH & Co. KG, Plinganserstrasse 22, 8000 Munchen 70, Germany, undated brochure.

*Primary Examiner*—Benjamin R. Fuller
*Assistant Examiner*—Eric Frahm
*Attorney, Agent, or Firm*—Biebel & French

[57] ABSTRACT

An error detection apparatus and method for use with engravers, such as gravure engravers. An error value E corresponding to the difference between a set of predetermined setup parameters and actual measurement of a portion of an engraved area on the cylinder is determined. The error value E is then used to adjust the engraver to engrave an actual cut or etch in accordance with the set of predetermined setup parameters. Advantageously, an error detection and correction system is suitable for providing a closed-loop system for engraving a cylinder. The apparatus and method may be used during initial setup or during normal operation of the engraver.

15 Claims, 10 Drawing Sheets

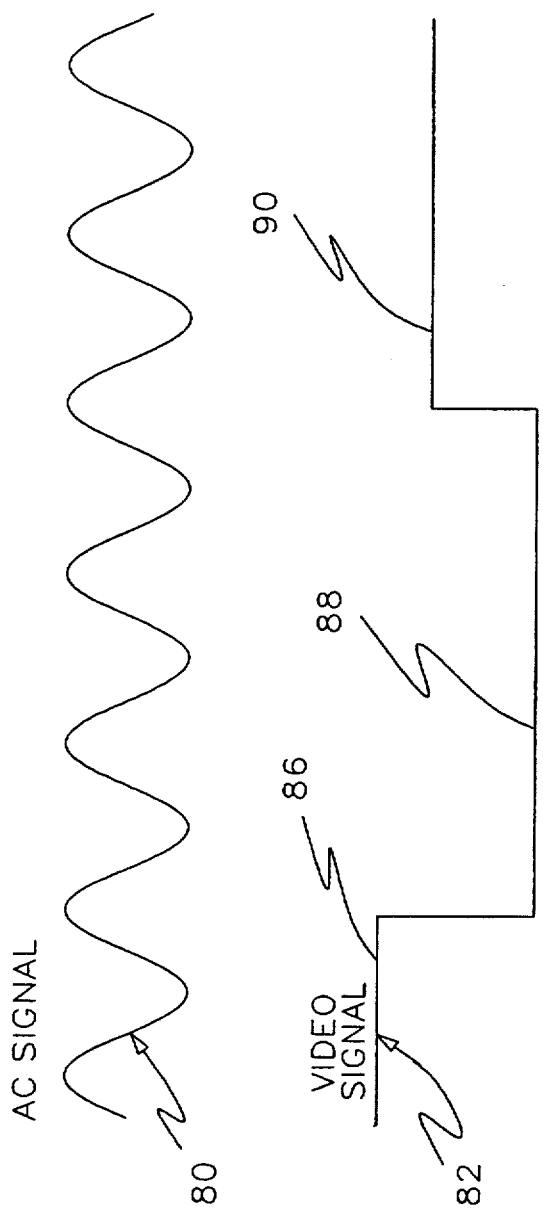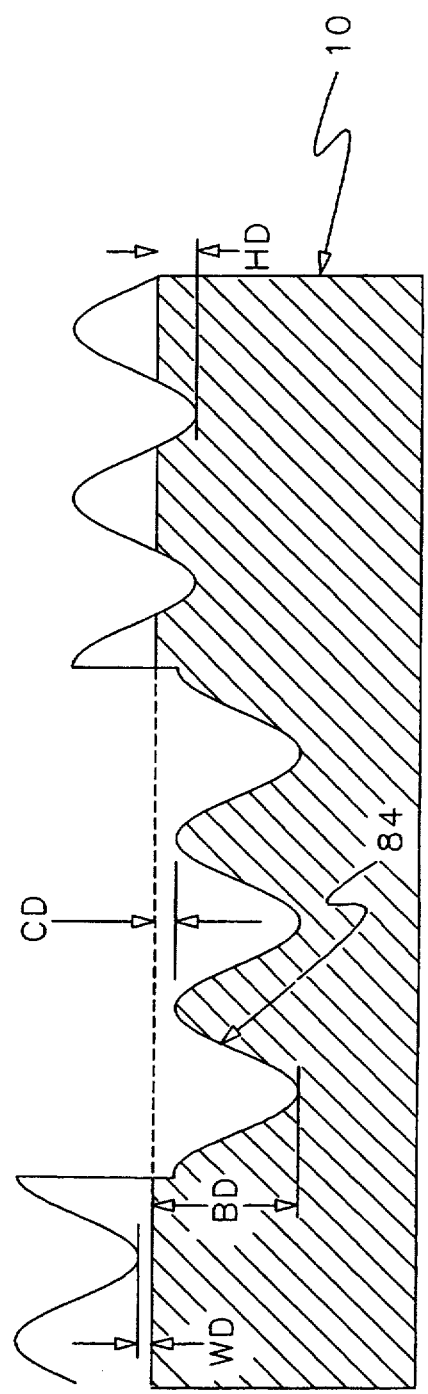
FIG-3

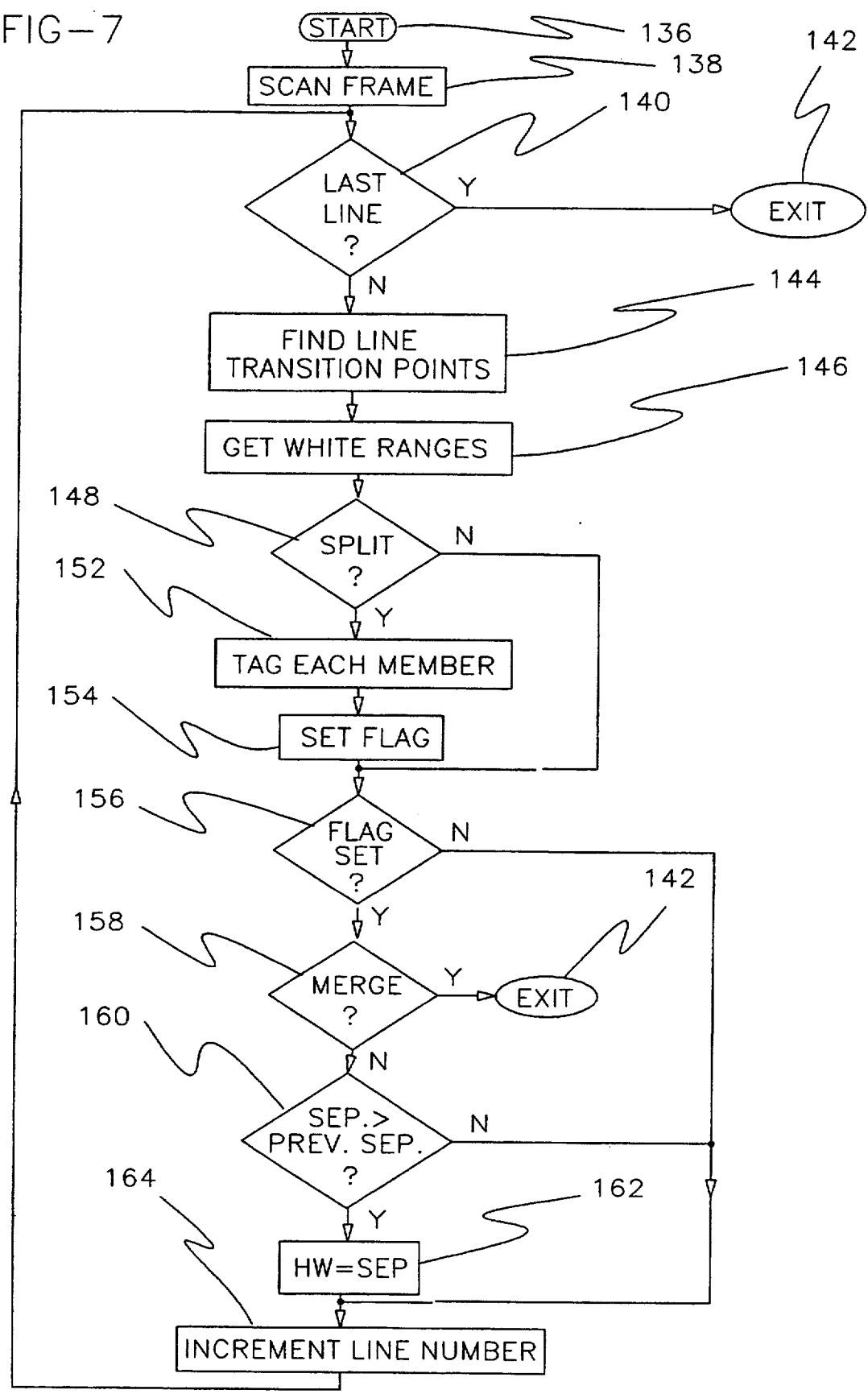

ERROR DETECTION APPARATUS AND METHOD FOR USE WITH ENGRAVERS

CROSS-REFERENCE TO RELATED APPLICATION

This application is a continuation-in-part of pending Ser. No. 08/038,679, filed Mar. 26, 1993, which is a continuation-in-part of pending Ser. No. 08/022,127, filed Feb. 25, 1993, now both abandoned.

BACKGROUND OF THE INVENTION

This invention relates to engraving heads of the general type disclosed in Buechler U.S. Pat. No. 4,450,486. Such engraving heads comprise a diamond stylus carried by a holder mounted on an arm projecting from a torsionally oscillated shaft. A sine wave driving signal is applied to a pair of opposed electromagnets to rotate the shaft through a maximum arc of approximately 0.25° at a frequency in the neighborhood of about 3,000 to 5,000 Hz.

A guide shoe is mounted on the engraving head in a precisely known position relative to the oscillating stylus. The engraving head is supported for tilting movement by a set of leaf springs secured to a rearwardly projecting bar. A DC motor rotates the bar so as to bring the guide shoe into contact with a printing cylinder to be engraved. When the guide shoe is in contact with the printing cylinder, the stylus oscillates from a position just barely touching the printing cylinder to a retracted position about 100 microns distant from the surface of the cylinder.

Once the guide shoe is in contact against the printing cylinder a video signal is added to the sine wave driving signal for urging the oscillating stylus into contact with the printing cylinder thereby engraving a series of controlled depth cells in the surface thereof. The printing cylinder rotates in synchronism with the oscillating movement of the stylus while a lead screw arrangement produces axial movement of the engraving head so that the engraving head comes into engraving contact with the entire printing surface of the printing cylinder.

In engraving systems of the type taught by Buechler, it is necessary for the machine operator to perform a tedious trial and error setup procedure at one end of the printing cylinder prior to commencement of engraving. This procedure involves adjustment of the gain on amplifiers for the sine wave driving signal and the video signal so as to produce "black" printing cells of a desired depth together with connecting channels of another desired depth and clean non-engraved white cells. Each change of one of the control variables interacts with the others, and therefore the setup becomes an iterative process. Even after a proper setup has been achieved, cell depth errors may accumulate due to mechanical drifting.

Engraving errors of a particularly serious nature occur when the engraving stylus becomes overstressed and fractures. Such a failure can completely ruin a nearly completed printing cylinder, if not detected immediately. Heretofore there has been no way of quickly and automatically detecting such a condition.

It is therefore seen that a need has existed for an engraving system which may be quickly and easily set up to engrave cells of precisely controlled dimensions in the surface of a gravure printing cylinder. A further need has existed to avoid error accumulation during engraving.

SUMMARY OF THE INVENTION

In one aspect, this invention provides a method for adjusting an engraver to engrave a cylinder with an actual cut according to predetermined setup parameters, said method comprising the steps of: (a) determining an observed error corresponding to the difference between a cell dimension command and a measured value of the resulting dimension in an engraved cell; and (b) adjusting the cell dimension command in a manner which eliminates the observed error.

In another aspect, this invention provides an apparatus and method for measuring the width of an engraved printing cell by sensing black/white transactions in scanned lines of video information.

The present invention also provides an engraving apparatus and method wherein a plurality of parameter signals are supplied to a computer for generating an engraving width command. An input AC signal and an input video signal are applied to the computer for multiplication by multiplication factors which are generated in response to the input parameter signals. The computer also generates a white offset signal which is combined with the processed AC and video signals to produce a driving signal for the engraving stylus. The stylus then engraves cells of the desired geometry.

A video camera is operated to produce a frame of video information including an image of a highlight cell which has been engraved by a video signal of a predetermined level. A video processing circuit measures the width of the cell which has been so imaged and reports it to the computer. The computer then adjusts the multiplication factors and the white offset through use of a correction parameter which is generated on a closed loop basis by cumulating differences between the expected cell width and the measured cell width.

The invention additionally provides a method and apparatus for quickly and automatically detecting cell width errors which are outside a predetermined limit. A repeated occurrence of such large magnitude errors is considered indicative of a broken stylus and automatically terminates the engraving operation.

BRIEF DESCRIPTION OF THE DRAWINGS

FIG. 3 is a schematic illustration of AC and video signals for controlling an engraving stylus and the engraving movement which results therefrom;

FIG. 7 is a flow chart of a cell width measuring algorithm; and

DESCRIPTION OF THE PREFERRED EMBODIMENT

Figure 1:
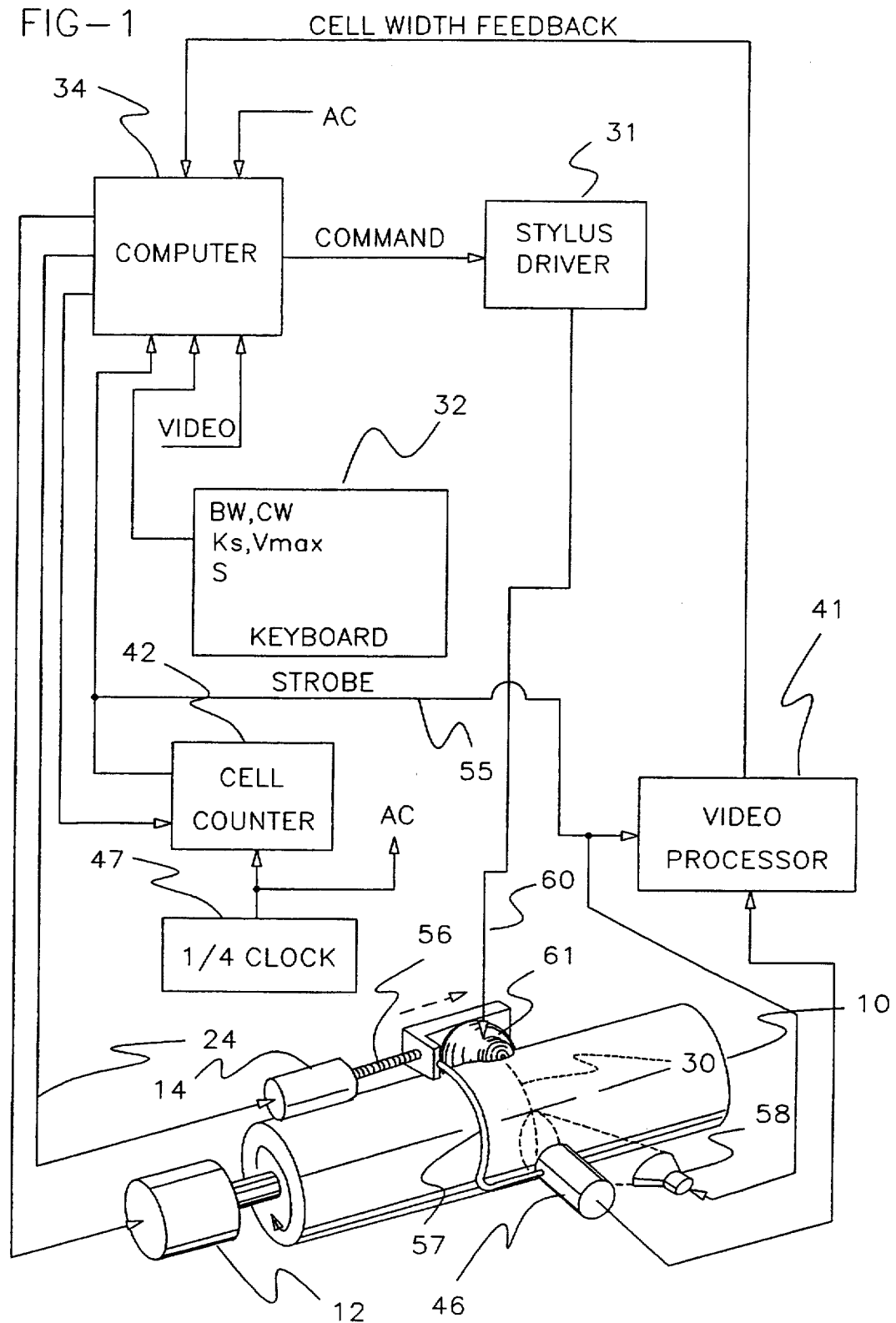
FIG. 1 is a schematic illustration, partly in perspective, of a programmable engraving system according to the present invention.

Referring to FIG. 1 there is illustrated a gravure printing cylinder 10 mounted for rotation by a drive motor 12 and engraving by an engraving stylus (not illustrated) carried by an engraving head 61. During the engraving operation, the stylus moves engravingly toward and away from printing cylinder 10 to produce a series of cells arranged along a track 30. A lead screw motor 14 rotates a leadscrew 56 to cause movement of the stylus in a direction parallel to the axis of cylinder 10. If lead screw motor 14 moves continuously, then track 30 will have a helical configuration. Intermittent energization of motor 14 produces a series of spaced circular tracks 30.

The engraving stylus is driven into engraving contact with print cylinder 10 by an electromagnetic driver (not illustrated) operating in response to a drive control signal on line 60. The drive control signal is generated by an amplifier 31 which amplifies a command signal produced by a computer 34. The electromagnetic driver may be configured as generally disclosed in Buechler U.S. Pat. No. 4,450,486.

The command signal has an AC component, a video component and a white offset component, WD, appropriate for producing an engraving action as hereinafter described. The AC component is derived from an AC input signal which is applied to computer 34 and multiplied by a gain factor Ka. The video component is generated within computer 34 by taking an input video signal and multiplying it by a gain factor Kd.

Computer 34 generates the parameters Ka, Kd and WD by solving a set of three equations as described below. A keyboard 32 is provided in order enable to entry of values for setup parameters appearing in the three equations. These parameters are black cell width, BW, channel width CW, a stylus constant, Ks, and the black cell voltage, Vmax. A shoe offset, S, may also be entered if desired.

As hereinafter discussed in more detail, the AC component of the command signal causes the stylus to oscillate in a sinusoidal manner relative to printing cylinder 10 with a wavelength dependent upon the surface speed of the cylinder. The rotational speed of drive motor 12 must be adjusted so as to produce an engraving track 30 having an odd number of half wavelengths during a full engraving rotation. Computer 34 transmits a lead screw control signal to lead screw motor 14 via a line 24. This signal is adjusted so as to cause lead screw motor 14 to advance the stylus an axial distance equal to one-half of a black cell width plus one-half of a connecting channel width, plus one separating wall width during each complete rotation of the printing cylinder 10.

The equations for Ka, Kd and WD assume a linear relationship between the input video signal and a resultant engraved cell width. While this is a fairly accurate assumption in many cases, there are times when adjustments are required. If so, then tabulated corrections may be made as taught in Ser. No. 08/022,127, the parent application hereof, the disclosure of which is incorporated herein by reference.

Another problem is drift. Although computer 34 may be programmed properly and may initially produce correct cell widths, gain changes in analog components or mechanical changes in the positioning of engraving head 61 may require incorporation of an adjustable correction parameter in the equations employed for calculation of Ka, Kd and WD. For this purpose there is a video camera 46 which is focussed on track 30. Camera 46 views a portion of track 30 which is illuminated by a strobed lamp 58 and provides frames of video feedback information to a video processor 41. Strobe signals for lamp 58 are provided at the correct frequency and phase by a cell counter 42 on line 55. Cell counter 42 or means for counting cells counts pulses generated by a clock 47 at four times the AC frequency. At this frequency a clock pulse is generated each quarter wavelength of engraving stylus oscillation.

Video camera 46 is mounted on a frame 57 supported by leadscrew 56. Camera 46 is adjustable relative to frame 57 so as to generate frames of video information which are centered upon track 30. Preferably, camera 46 comprises a CCD array which produces a new frame of video information with each flash of lamp 58. Preferably lamp 58 and video camera 46 are combined into a unit with a common lens (not illustrated) so that video camera 46 views the cylinder area which is illuminated by flashes from lamp 58. Preferably, also, the video camera 46 is an autofocus camera which can focus on surfaces over a range of distances. The video processor 41 is capable of controlling the autofocus feature, so that camera 46 may provide focussed video information from the surfaces of printing cylinders of different radii.

Figure 2:
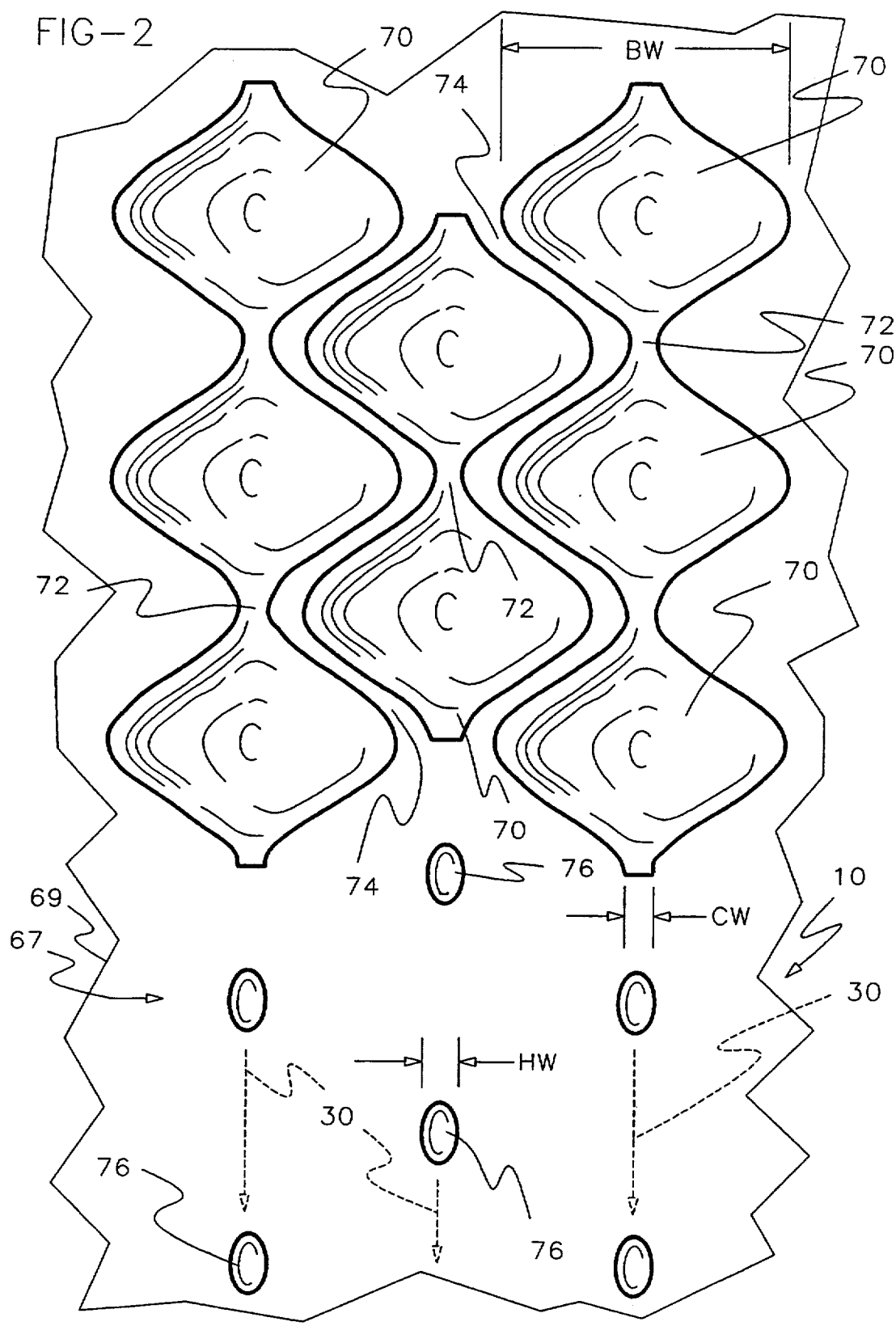
FIG. 2 is a schematic illustration of a series of cells engraved in a printing cylinder.

The geometrical configurations of typical black cells, connecting channels for black cells, highlight cells and separating walls are illustrated in FIG. 2. That figure depicts a series of wide, deep black cells 70 and a series of shallower and narrower highlight cells 76. The illustrated cells comprise portions of three side-by-side engraving tracks 30. Black cells 70 have a maximum width BW. The control signal for the stylus is adjusted so as to produce connecting channels 72 between successively engraved black cells 70. Channels 72 have a width CW, while highlight cells 76 have a width HW. The scalloped edges of the cells 70 result from the vertically oscillating cutting action of the stylus during rotational movement of printing cylinder 10 thereunder. As further illustrated in FIG. 2, a series of successively engraved black cells 70 may be separated by a wall 74 from a series of successively engraved cells 70 (also illustrated as being black cells) in an adjacent engraving track 30.

A series of cells configured as illustrated in FIG. 2 will print a graphic pattern defining a diagonally extending screen. The tangent of the screen angle is the ratio of the distance betwen alternate engraved rows to the wavelength of the stylus cutting motion. The cutting wavelength is a function of the surface speed of the printing cylinder 10 and the oscillation frequency of the stylus. Thus, the screen angle may be adjusted by adjusting the rotational speed of drive motor 12, but such adjustment must be made in incremental steps so as to maintain an odd number of half wavelengths around the circumference of the printing cylinder. Alternatively, the screen angle may be adjusted by adjusting the distance between vertical rows by changing the operating speed of leadscrew motor 14.

The stylus driving signals and the resulting vertical movement of the stylus tip are illustrated in FIG. 3. The driving signal is obtained by adding an AC signal 80 to a video signal 82. The illustrated video signal 82 has, by way of example, a white video level 86, a black video level 88 and a highlight video level 90. The video signal and the AC signal are combined with an offset such that the stylus is raised out of contact with the cylinder surface during the entire time that video signal 82 has a white level 86. The minimum white elevation is WD.

When video signal 82 goes from a white level to a black level, the stylus moves into engraving contact with the cylinder as shown by stylus position line 84. In this condition the stylus oscillates between a minimum depth CD and a maximum depth BD. When the stylus is at the depth CD, it engraves a connecting channel 72. When video signal 82 shifts to a highlight level as indicated by the reference numeral 90, the stylus oscillates between a position out of engraving contact with cylinder 10 to an engraving position having a maximum depth HD. AC signal 80, video signal 82 and a white offset signal are produced by computer 34.

In the illustrated embodiment computer 34 generates an engraving width command W for stylus driver 31 according to the equation:

$$W = (Ka*A*(Sin(\omega*t) - 1) - WD + Kd*V)/Ks$$

where:
Ka = AC gain
A = maximum value of AC input signal
ω = angular frequency of AC input signal
t = time
V = video signal value
Kd = video gain
WD = white depth
Ks = stylus constant The values of A and ω are stored in computer 34 and ordinarily do not change. Ks is an adjustable input parameter and is entered via keyboard 32.

The video gain is obtained by solving the equation:

$$Kd = Ks*(BW - HW)/(Vmax - Vh)$$

where BW and Vmax are input parameters from keyboard 32. Vh is determined by examining the video signal as hereinafter described, and HW is read from a memory as a tabulated function of Vh.

The white depth is found from the equation:

$$WD = Kd*Vmax - Ks*BW$$

and the AC gain is calculated from:

$$Ka = -A(Ks*CW + WD - Kd*Vmax)/A$$

When Sin (ω* t) = 1 and V = Vh, the width command causes the stylus to engrave the widest part of a highlight call. Therefore in an ideal, error free, case $$HW = (-WD + Kd*Vh)/Ks$$

However, in general there is an engraving error E, so that the measured width of a highlight cell is:

$$HM = (-WD + Kd*Vh)/Ks - E$$

Computer 34 compensates for this error by using a correction parameter C in the calculation of the engraving width command. This correction parameter is generated by a closed loop feedback control technique involving video processor 41 and camera 46.

Prior to the commencement of engraving, C is set to an initial value of zero. During engraving computer 34 causes video processor 41 to provide a series of values of HM for a series of cells which are engraved at times when V = Vh. For each such measurement, computer 34 calculates the width error from the equation:

$$E = (-WD + Kd*Vh)/Ks - HM$$

The correction term then is generated by summing a series of errors as the correction progresses. A gain term G is also employed, so that $$C = \Sigma(G*E)$$

In the most simple embodiment the computed value of C is merely added to the engraving width command. Thus the adjusted engraving width command takes the form:

$$W = (Ka*A*(Sin(\omega*t) - 1) - WD + Kd*V)/Ks + C$$

Adjustment of the value of C proceeds only in response to measurements of cells which were engraved when V had a value of Vh. However, the calculation of W always includes a contribution from the most recently calculated value of C. Irrespective of the manner of use of the correction parameter C, its value grows from an initial setting of zero to a magnitude which will substantially eliminate any error in the width of an engraved highlight cell and substantially reduce engraving width errors in cells of other types. For all closed loop embodiments, G is set to a value which provides tight but stable control. A value near 1.0 should be satisfactory in most cases.

Figure 5:
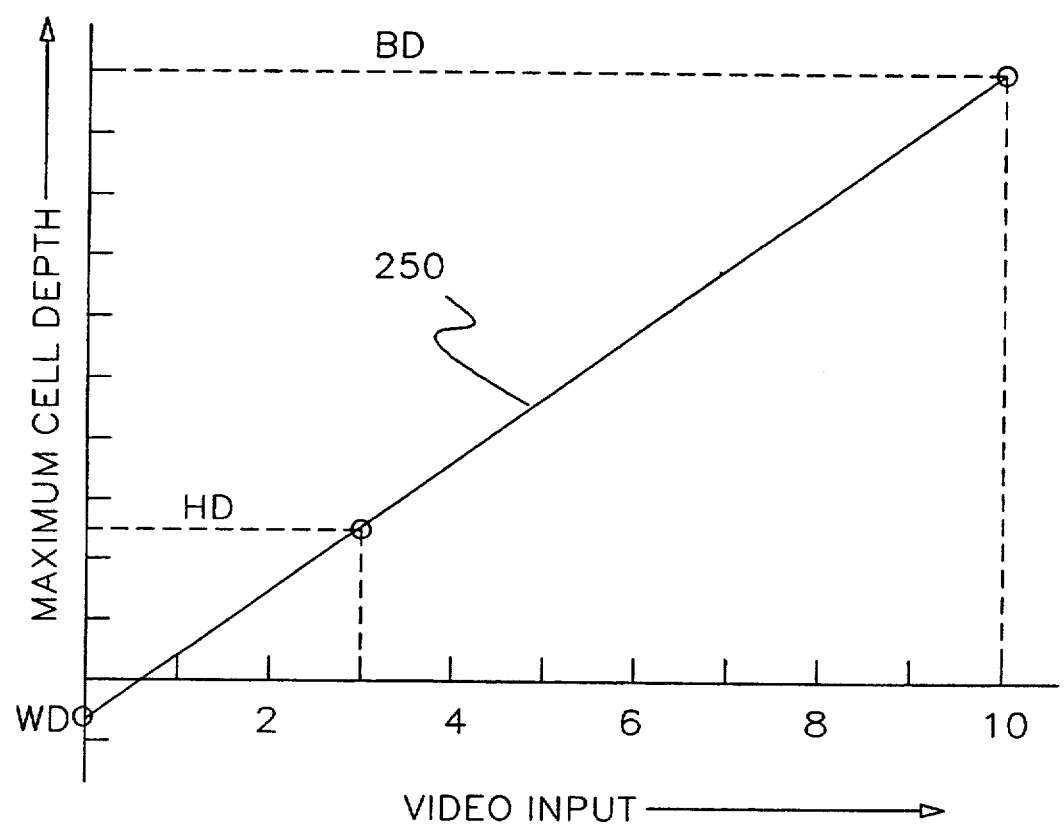
FIG. 5 is a graphical plot of the maximum cell depths resulting from video input signals ranging from 0 to 10 volts.

Referring now to FIG. 5, the maximum cell depth is seen to be directly proportional to the video input signal. As illustrated in the figure, a maximum 10 volt video input signal produces the maximum cell depth BD required for engraving a black cell. For the illustrated example, computer 34 has been given a highlight width HW = 0.25*BW. Hence the highlight depth HD is 25% of BD. The Figure also reflects a setting of 3 volts for Kh. Under those conditions a video signal having an amplitude equal to 30% of a "black" video signal produces a cut having a depth which is only 25% of the black cell depth. As a result the maximum cell depth goes to zero for a video input of about 0.7 volts. For video signals smaller than that amount, the cutting stylus remains out of contact with the printing cylinder. For a "white" video input the stylus is retracted from the engraving cylinder by a minimum distance WD, which is the white offset.

It is important that camera 46 be adjusted for viewing a precisely determined position of track 30. It is to be noted that an individual cell is strobed while the engraver is engraving. For this purpose, the stylus is activated to engrave a test track at one end of cylinder 10. Video camera 46 is strobed to produce a sequence of images which are analyzed by video processor 41. Meanwhile computer 34 counts the camera strobes as a measure of the displacement between the engraving position of the stylus and the field of view of camera 46. When video processor 41 recognizes the test track, it signals computer 34 to save the strobe count. The computer uses this count to control the timing of strobes on line 55 for imaging specific cells known to have been engraved at particular points in time.

Figure 4A:
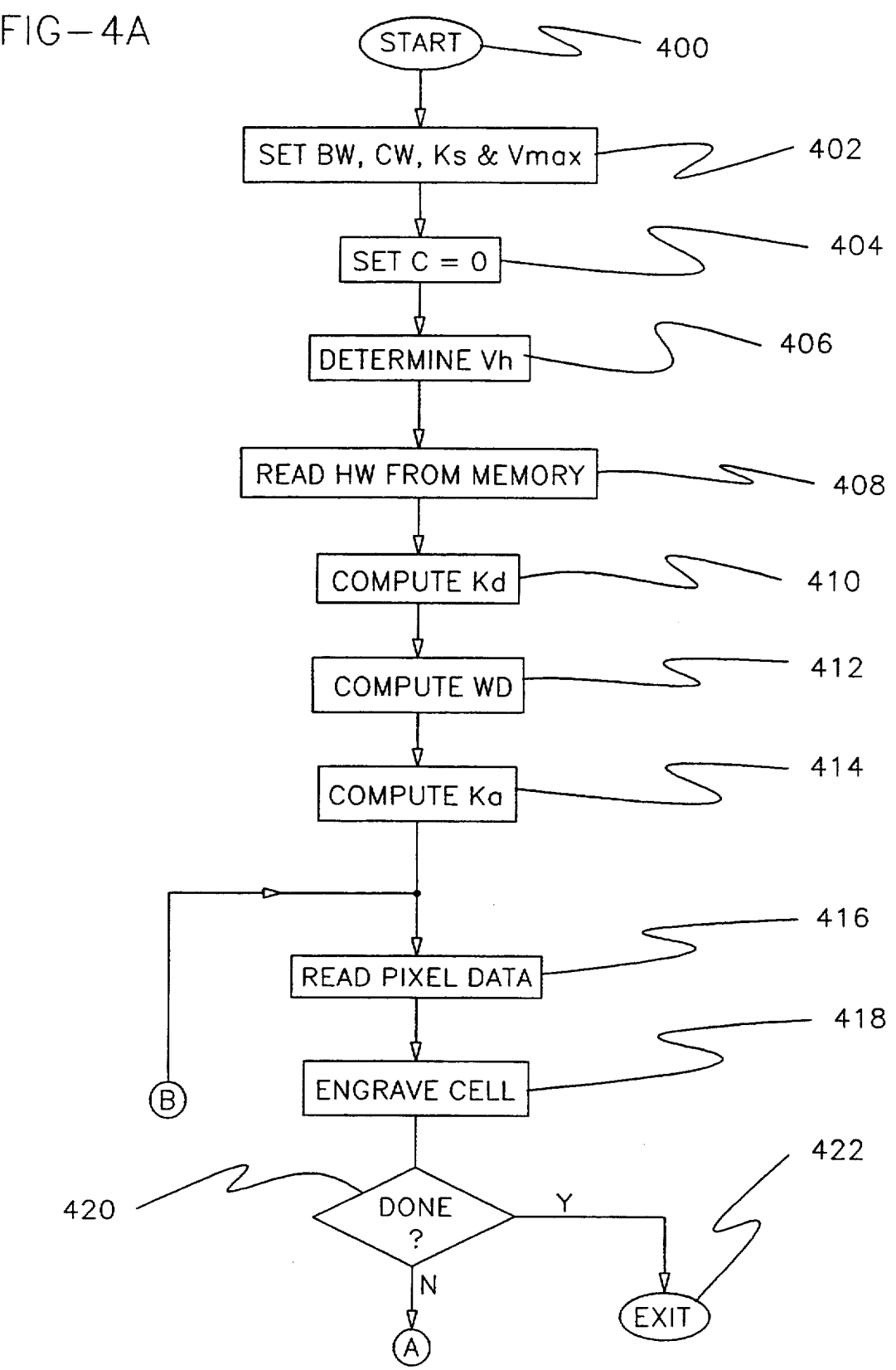
FIGS. 4A and 4B are a flow chart illustrating the method of cell width control and broken stylus detection in accordance with the invention.
Figure 4B:
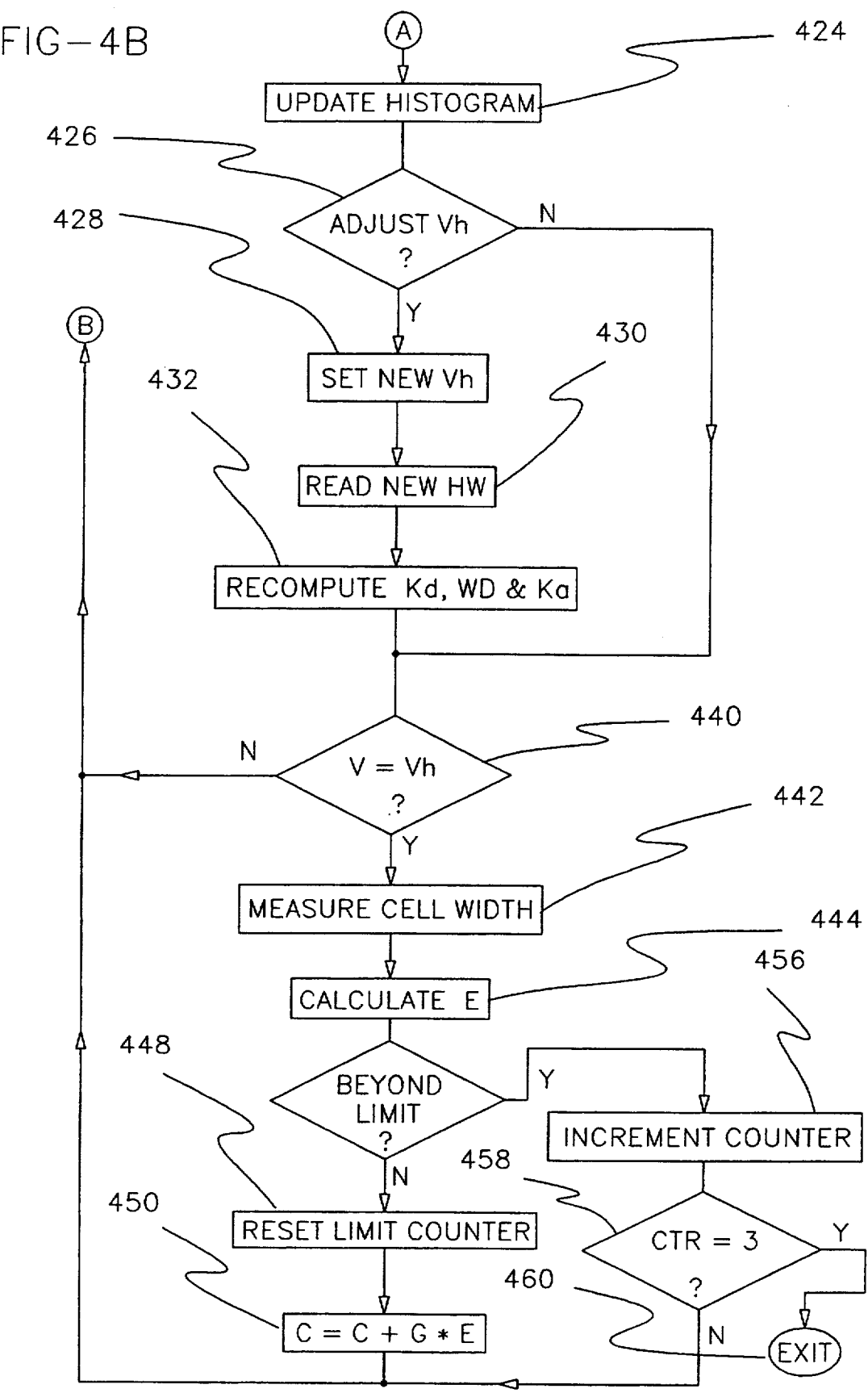

FIGS. 4A and 4B illustrate the above-described method of controlled engraving and error correction. The method begins at a start point 400 and proceeds to block 402 where black width BW, channel width CW, stylus constant Ks, and the maximum video signal Vmax are input to computer 34 via keyboard 32. The correction parameter C, is initialized to a value of zero (block 404), after which computer 34 processes an initial block of video data to determine the most frequently occurring value of video voltage. The value is set equal to Vh (block 406). This value of Vh is used as an address for reading a desired value of HW from memory (block 408). Next, computer 34 computes Kd (block 410, WD (block 412) and Ka (block 414). Although not illustrated in FIGS. 4A and 4B, computer 34 may at this time generate commands for engraving a test track for establishing a strobe timing count, as discussed above. Engraving of printing cells may then commence.

It will be appreciated that the video signal is digitized, so that it always occurs at one or another of a series of discrete levels. The computer samples the video signal and creates a video signal histogram by counting the number of signals of each digitized signal level. The highlighted signal, Vh is deemed to be that video voltage level having the highest number of occurrences.

During normal engraving computer 34 reads pixel data (block 416) and generates engraving width commands for cell engraving (block 418). As each cell is engraved, computer 34 checks for job completion (point 420) and exits (point 422) if the printing job is done. If the printing job is not done, then the video histogram is updated (block 424) and a check is made to see whether Vh should be adjusted (point 426). If so, an appropriate adjustment is made (block 428), and a new value of HW is read from memory (block 430). Then the computer recalculates Kd, WD and Ka (block 432).

Next, a check is made (point 440) to determine whether the current pixel is a highlight pixel. If the current pixel is a highlight pixel, then a cell width measurement is made (block 442) and the width error is calculated (block 444). Otherwise the program returns to block 416 where another pixel value is read.

The measured error is used at block 450 for updating the correction parameter, but only if the error is within a predetermined limit. A check is made for a "Beyond Limit" condition at point 446. If the maximum allowable error is exceeded, then a limit counter is incremented (block 456), and a check is made to determine whether the limit has been exceeded for three consecutive measurements (point 458). If so, then the program exits at point 460, and engraving is terminated. An appropriate alarm may be activated at this time to advise an operator that the stylus should be checked for damage.

In general, an integration function should be employed for defining C, so that the parameter will approach a non-zero steady state value. However, the integrated correction parameter may be used in a variety of ways for adjusting the cell width command. For example, it may be used as a multiplication factor for the cell width command, rather than as an additive term. Also, it may be used as a multiplier or as an offset for any of the variables employed in the calculation of the cell width command. The preferred use depends upon the nature of the error being corrected. In a system where the error varies with the magnitude of the video signal the computed value of C may be added to Kd; provided, however, that WD and Ka are recalculated each time C is adjusted. In another embodiment where there is a drift in the home position of the stylus, C may be added to WD; Ka being thereafter recalculated. So long as the correction variable is used with a polarity which drives the value of the cell width command in the proper direction, correction will continue until E goes to zero.

The value of BW then is used in the computation of the engraving parameters. Keyboard 32 may also provide computer 34 with an adjustment parameter, S, related to the separation distance between engraving head 61 and printing cylinder 10. If this parameter is provided, it is treated as a depth offset which is multiplied by Ks and added to BW, CW and HW prior to performing the above outlined solution.

As stated above, the error correction system comprising the computer 34 calculates the error value E for cells which have been engraved in response to a video signal V having a value equal to Vh. In the embodiment described above computer 34 adjusts Vh from time to time for correspondence with the value of V having the highest cumulative running count. It is also feasible to restart the count from time to time, so that the highlight setting algorithm becomes localized in nature. This may be desirable for a very large graphic reproduction. As described above, a predetermined value of HW is associated with each digitized value of Vh. HW may be read from a stored table or calculated from an appropriately written empirical equation.

The computer 34 may signal an "out of limit" condition upon detection of a cell width error in excess of any predetermined amount. In a typical application of the invention a suitable maximum allowable error may be in the order of about 10 microns. If that limit is exceeded more than a prescribed number of times, then engraving is terminated, as stated above. At this point an operator checks the stylus, replaces it if necessary, and wipes the printing cylinder to clean off any diamond chips which have accumulated. Next, the operator initiates a new test cut sequence. Then the engraver returns to the revolution prior to the revolution in which the "Beyond Limit" condition was first detected. The affected revolutions are recut, and the engraver is halted for operator examination of the result. If the recut rows are acceptable, then the operation is continued. Otherwise the printing cylinder is scrapped.

Figure 6:
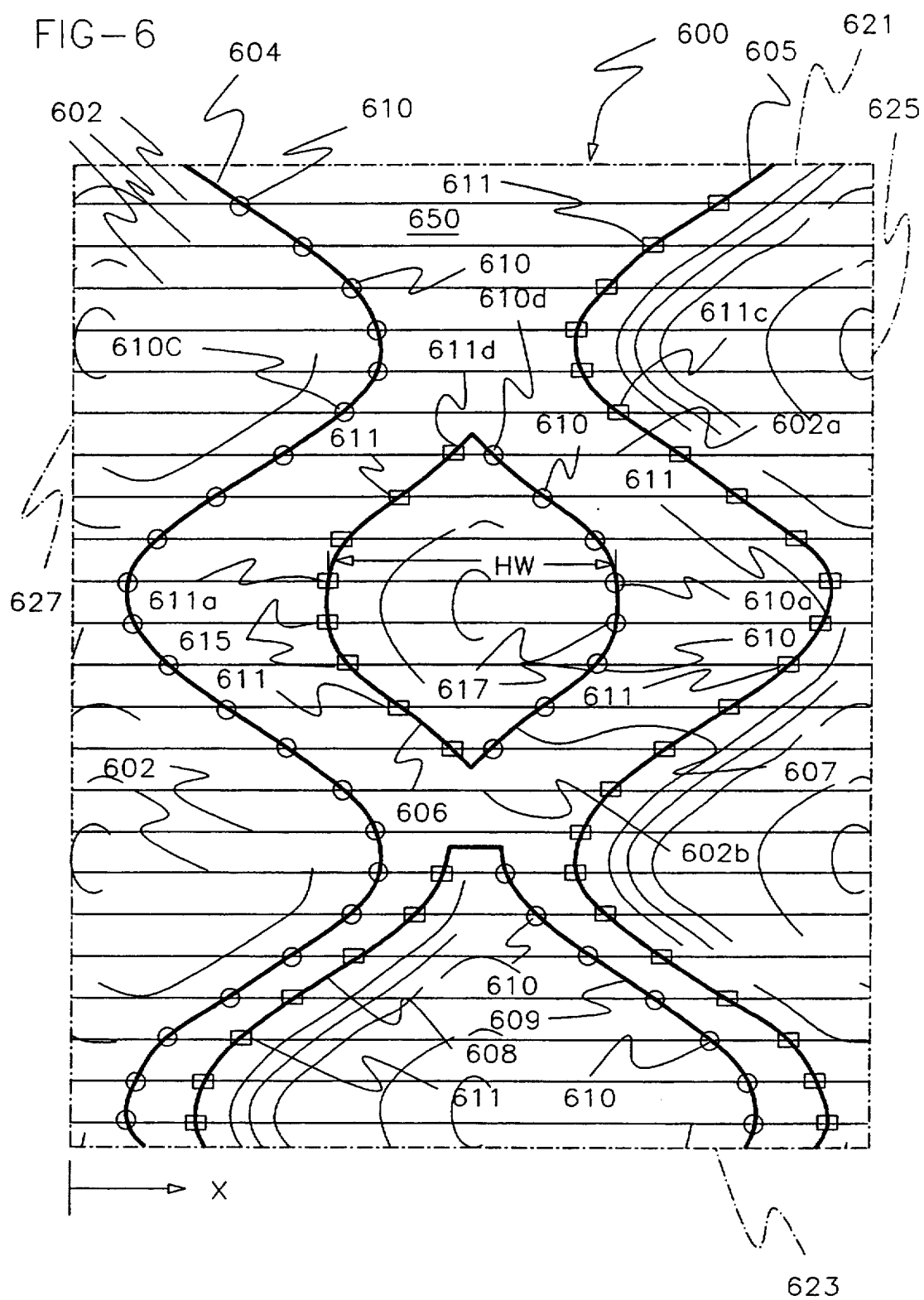
FIG. 6 is a schematic illustration of a video frame including a highlight cell.

FIG. 6 illustrates a typical frame of video information 600 including a highlight cell 606 which was engraved PC clock counts prior generation of the strobe which produced the frame 600. Frame 600 comprises a series of horizontal lines which are too numerous for illustration. Representative horizontal video lines are indicated by the reference numerals 602. These lines are a subsampling of the cell image captured by the strobe. The actual cell size dimensions are measured from these lines.

Video processor 41 processes lines 602 sequentially from top to bottom. The video information is enhanced through a localized thresholding technique. This technique involves a division of the image into small rectangular regions. The video data for each region is examined, and the brightest and dimmest pixels are identified for each region. Then a black/white threshold is set at the mid-brightness level between the brightest and dimmest pixels. Those pixels within the region which are lighter than the threshold are deemed to be white, whereas pixels which are darker than the threshold are deemed to be black. All rectangular regions are examined, and all pixels have their brightness adjusted to black or white, depending upon the raw brightness level relative to the localized threshold.

Each line of enhanced video information is examined for the presence of black/white and white/black transitions. FIG. 6 illustrates black/white transitions by symbols denoted by the reference numeral 610, whereas white/black transitions are denoted by symbols indicated by the reference numeral 611. This establishes a series of boundary lines as illustrated in FIG. 6 by reference numerals 604, 605, 606,607, 608 and 609. These boundary lines define a white region 650.

Video processor 41 recognizes the white region 650 by a black/white transition 610 followed by a white/black transition 611. For each such transition pair, video processor 41 establishes a first linked list. If the programming is performed in the C language, for example, then such a linked list may be represented by an entity known as a structure. Each such linked list includes the X coordinates of the left and right boundaries of the white region indicated by the transition pair. The linked lists for each scan line 602 are associated with the linked lists of the preceding scan line by comparison of the boundary points.

For the first six video lines 602 of FIG. 6, only one white span (and one linked list) appears. However, on the seventh horizontal line, denoted by the reference numeral 602a, two additional transition points 611d, 610d appear. These two new transition points mark the boundaries of highlight cell 60. It can be seen that the appearance of highlight cell 60 causes a "split" in the white region 650. Video processor 41 reacts to this split by establishing a second and third linked lists to replace the first linked list previously being processed.

Once a split is observed, the video processor knows that highlight cell 606 is present The video processor then compares the left boundary of the third linked list with the right boundary of the second linked list to determine the width of the highlight cell 606. The highlight width is calculated for each scan line 602 and compared with the highlight width calculated for the preceding scan line. Each time a comparison is made, video processor 41 saves the larger value. The process continues until the intermediate black region disappears (at 602b) and the two legs of white region 650 merge. At this point the measurement ceases and the processor saves the observed maximum value of HW as HM. Video processor 41 passes this value of HM to computer 34. The computer 34 associates the reported value of HM with the specific engraving command, which was sent to the stylus PC clock counts earlier than the strobe which produced the video frame.

FIG. 7 illustrates the above outlined measuring process in flow chart form. Thus, HW measurement begins at a start point 136 and proceeds to a scanning step at block 138. As discussed above, frame grabbing or scanning is initiated by a strobe signal on line 55.

Once a frame has been scanned the video processor checks the line number at point 140. If the bottom of the frame has been reached, then there is an exit at point 142. Assuming that the frame bottom has not been reached, the program proceeds to block 144 where it establishes transition points 610, 611. Then the program obtains the white ranges at block 146 for use in the above-described linked lists. Next the program looks for a split at point 148. If a split is noted, then the two resulting linked lists are tagged at block 152 and a flag is set at block 154.

The program checks the state of the flag at point 156 and jumps down to block 164 for a negative result. This means that the top of highlight cell 606 has not yet been reached and there is no need to measure a cell width. Consequently, the program simply increments the line number at block 164 and returns back to point 140.

If the check at point 156 indicates that the flag has been set, then the program checks for a merge at point 158. If a merge is noted, then the program exits from the measurement routine. If a merge has not yet occurred, then the program checks the separation distance between the two legs of the white region 650. This distance is compared at point 160 against previously saved separation distances. If the new separation distance is greater than any previously saved distance, then HW is set equal to that distance. Referring again to FIG. 6, the first separation distance is the distance between points 611d and 610d. This distance keeps increasing until the program reaches points 611a and 610a. At that point the separation distance is maximum, and no further adjustments of HW are made.

The video processor 41 then feeds the measured value of HW back to computer 34 for closed loop cell width control.

Figure 8A:
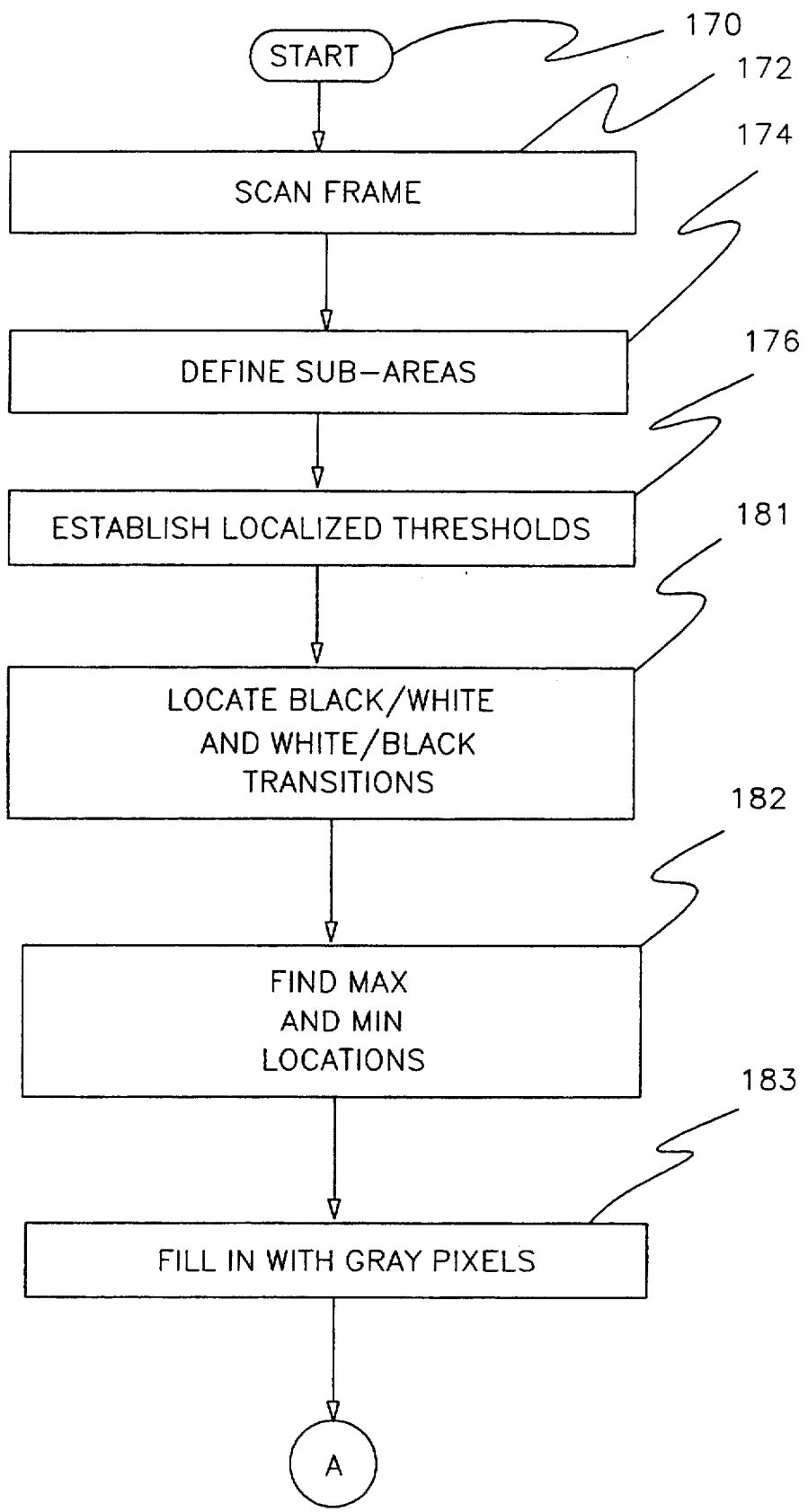
FIGS. 8A and 8B, taken together, show a flow chart of another measuring algorithm.
Figure 8B:
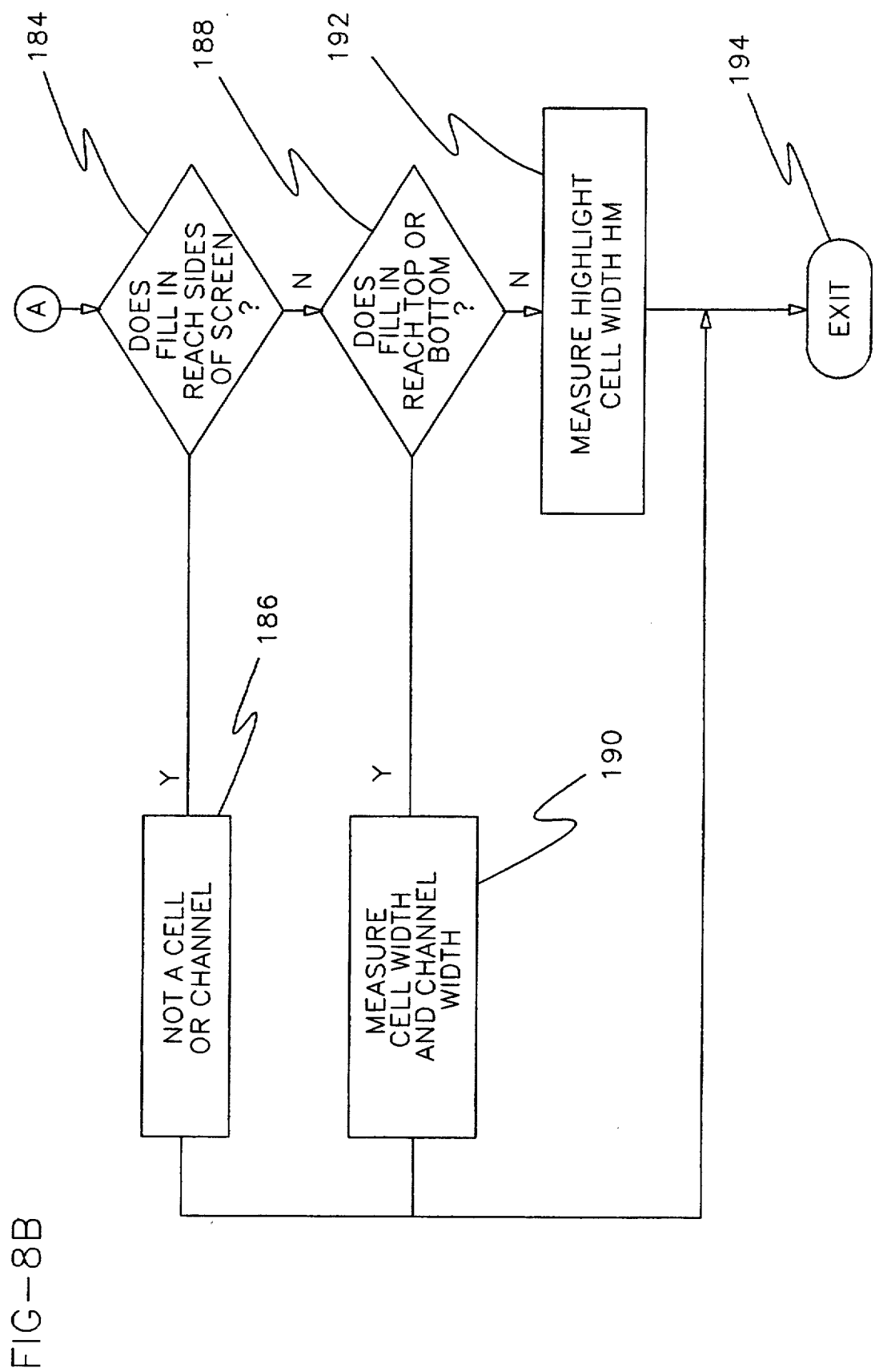

FIGS. 8A and 8B show another embodiment of the invention wherein cell width, channel width, and error value E are measured. In this embodiment, video processor 41 determines the existence of the white region 650 by the black/white transition 610 followed by a white/black transition 611. The cell which was actually measured and strobed is assumed to be generally located in the center of the scan frame 600.

After all the boundary transition points have been determined, the maximum and minimum distances between transition points which lie on the same horizontal scan line 602 are determined. These values are conventionally subtracted by video processor 41, thereby resulting in values associated with the distance between the walls of highlight cell 606. Video processor 41 then scales these values to the pixel sizes of video camera 46 (FIG. 1).

It is to be noted that the minimum distance determined by video processor 41 corresponds to the channel width. If the video processor 41 determines that the minimum distance is below zero, then there is no channel and the observed cell now may be assumed to be a highlight cell. As with the maximum distance, the minimum distance between black/white and white/black transitions which lie on the same line 602 are scaled to the magnification and pixel sizes of video camera 46 (FIG. 1).

Referring now to FIG. 8A, the measuring process begins at start block 170 and proceeds to scan a frame of data at block 172. After the frame of data has been captured, the data is broken down into a plurality of localized sub-areas at block 174. By using these smaller localized sub-areas, video processor 41 and computer 34 are able to process data faster. This is similar to the measuring process described above with respect to FIG. 7. Threshold levels are determined for each localized subarea (block 176), and localized thresholding is performed to locate all black/white and white/black transitions (block 181). Then the maximum and minimum transition points on each scan line are identified by video processor 41 at block 182. These maximum and minimum transition points are assumed to coincide with the side boundaries of the cell. At block 183 the portions of memory which store the video data covering the area between the maximum and minimum transitions for each line are filled in with gray pixels.

At point 184, the video processor 41 checks to determine if the memory fill in has reached the sides 625 and 627 (FIG. 6). If it has reached sides 625 and 627, then video processor 41 determines that no cell or channel is being measured (block 186). If it has not reached sides 625 and 627, then video processor 41 determines if the fill in has reached top 621 or bottom 623 at point 188. If the top 621 or bottom 623 has been reached, video processor 41 calculates the channel width and cell width at block 190 using the maximum and minimum values determined at block 186. If the top 621 or bottom 623 has not been reached, then video processor determines the measured highlight cell width HM at block 192. After all the measurements have been determined, video processor exits at point 194, whereupon an error value E is determined by computer 34 in the manner described earlier herein.

It is to be noted that this system may be used during initial setup or during the normal operation of the gravure engraver. Thus, the system and method described herein can provide "real time" display of the actual measurement and "real time" correction for any error value E.

It should be appreciated that the cell measuring method of this invention could measure cell dimensions while printing cylinder 10 were being held stationary (i.e., not revolving during). It should also be noted that the system and method for measuring may provide cell dimensions an open loop basis. Measurements, so obtained, could be displayed to a human operator, who could then enter manual adjustments of an appropriate correction parameter.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A gravure engraver comprising:
means for oscillating a stylus into engraving contact with a rotating printing cylinder;
a video camera for generating an image signal representing images of at least one cell engraved in said rotating printing cylinder;
video processing means for processing said image signal and generating a feedback signal indicating a size of said at least one cell; and
computing means responsive to said feedback signal for adjusting an operation of said stylus.

2. A gravure engraver comprising:
support means for rotatably supporting a printing cylinder;
rotary drive means for rotating said printing cylinder about a cylindrical axis of said printing cylinder;
a stylus for engraving cells in a surface of said printing cylinder;
an engraving control means comprising video signal generating means for generating a video signal indicating a series of brightness levels in an image to be represented by said cells; setup means for entry of setup parameters indicating a desired relationship between said brightness levels and a width of a plurality of said cells; means responsive to said setup parameters and said video signal for generating a series of cell width engraving commands; a stylus driver responsive to said cell width engraving commands for driving said stylus into engraving contact with said surface; and sensing means for sensing the widths of said plurality of said cells engraved by said stylus and generating a corresponding cell width feedback signal;
said computing means being responsive to said cell width feedback signal for correcting said cell width engraving commands in such a manner that said width of said plurality of cells indicated by said cell width feedback signal obeys said desired relationship;
said computing means further comprising means for generating a series of error values representing differences between a plurality of widths for a series of engraved cells and a corresponding series of commanded widths for said series of said engraved cells; means for generating a correction parameter corresponding to a summation of said error values; and means responsive to said correction parameter for adjusting said cell width engraving commands;
said sensing means comprising:
a video camera for generating an image signal representing images of said cells which have been engraved by said stylus; and
video processing means for processing said image signal to generate said cell width feedback signal.

3. A gravure engraver comprising:
means for oscillating a stylus into engraving contact with a rotating printing cylinder;
a video camera for generating an image signal representing images of at least one engraved cell;
video processing means for processing said image signal and generating a feedback signal indicating a size of said at least one engraved cell;
means for generating at least one error signal representing differences between said at least one size and a commanded value for said at least one size; and
means for indicating a warning when a magnitude of said at least one error signal exceeds a predetermined limit value.

4. Apparatus according to claim 3 and further comprising counting means for generating a count indicating successive occurrences of an error signal in excess of said predetermined limit value, and means for inhibiting said warning until said count reaches a predetermined number.

5. Apparatus according to claim 4 wherein said means for indicating comprises means which will cause indication of said warning when a magnitude of said error signal represents a cell width error greater than about 10 microns.

6. Apparatus according to claim 5 wherein said means for inhibiting comprises means which will inhibit said warning until said count reaches 3.

7. A method of measuring a width of an ink receiving cell situated within an area on a surface of a gravure printing cylinder comprising the steps of:
using a video camera to scan said area and generate a video signal indicating sequentially scanned brightness levels along a series of parallel scan lines extending in a widthwise direction across said area;
determining an associated maximum value and minimum value for said video signal for at least one sub-area of said area;

calculating a localized threshold value for said at least one sub-area;

threshold processing said video signal to determine a plurality of transition points where said video signal undergoes a brightness change;

identifying a pair of boundary points for said plurality of transitions; and calculating a distance between said boundary points as a measure of said width.

8. A method according to claim 7 further comprising the steps of:

establishing a top boundary point and a bottom boundary point for said cell;

identifying said pair of boundary points between said top boundary point and said bottom boundary point.

9. A method according to claim 8 wherein said video signal corresponds to a set of video pixel data; said method further comprising the step of:

converting a portion of said video pixel data to gray pixels.

10. A method according to claim 7 wherein said threshold processing step comprises the step of:

setting said localized threshold at a brightness level between brightness levels represented by said minimum and maximum levels of said video signal.

11. The method as recited in claim 7 further comprising the steps of:

measuring additional widths of a series of said receiving cells situated in said area;

operating said stylus to engrave a series of cells in said surface of said gravure printing cylinder;

calculating a series of error values representing differences between the widths of said engraved cells and corresponding desired values for said widths; and adjusting an operation of said stylus so as to engrave further cells for which calculated error values become negligibly small.

12. A gravure engraver comprising:

(a) means for rotating a gravure printing cylinder about an axis of said gravure printing cylinder;

(b) an engraving stylus;

(c) an engraving head for supporting said engraving stylus adjacent said gravure printing cylinder;

(d) a stylus driver responsive to a cell width command signal for oscillating said engraving stylus into engraving contact with said gravure printing cylinder to engrave a plurality of cells in said gravure printing cylinder;

(e) an automatically focussed video camera for creating images of said plurality of cells in said gravure printing cylinder;

(f) video processing means for processing said images and generating a feedback signal indicating widths of said plurality of cells; and (g) computing means for generating said cell width command signal in correspondence with desired widths for said engraved cells and adjusting said cell width command signal in correspondence with differences between said desired widths and said widths indicated by said feedback signal.

13. A gravure engraver according to claim 12 further comprising leadscrew means for advancing said engraving head in a direction parallel to said cylinder axis and in synchronism with rotation of said gravure printing cylinder.

14. A gravure engraver according to claim 13 further comprising cell counting means for counting said engraved cells and generating strobe signals for activation of said video camera to create said images of predetermined ones of said plurality of engraved cells.

15. A gravure engraver comprising support means for rotatably supporting a printing cylinder;

rotary drive means for rotating said printing cylinder about a cylinder axis;

a stylus for engraving cells of controlled width in a surface of said printing cylinder; and cell width measuring means comprising:

a video camera for scanning selected ones of said cells and creating images of said cells;

a video processor for processing said images and generating measuring signals indicating widths of said cells; and strobe means operating in synchronism with said drive means for selecting said selected ones of said cells.

* * * * *

UNITED STATES PATENT AND TRADEMARK OFFICE
CERTIFICATE OF CORRECTION

PATENT NO. : 5,440,398

Page 1 of 4

DATED : August 8, 1995

INVENTOR(S) : Holowko et al.

It is certified that error appears in the above-indentified patent and that said Letters Patent is hereby corrected as shown below:

On the title page, the "Related U.S. Application Data" section, please delete the following:
"Continuation-in-part of Ser. No. 38,679, Mar. 26, 1993, abandoned, which is a continuation-in-part of Ser. No. 22,127, Feb. 25, 1993, abandoned."

and insert the following therefor:
--Continuation-in-part of Ser. No. 38,679, Mar. 26, 1993, 5,438,422 which is a continuation-in-part of Ser. No. 22,127, Feb. 25, 1993, Pat. No. 5,424,845.--

At Column 1, please delete lines 7-10, and insert the following therefor:
--Continuation-in-part of Ser. No. 38,679, filed Mar. 26, 1993, now issued as U.S. Patent No. 5,438,422 which is a continuation-in-part of Ser. No. 22,127, filed Feb. 25, 1993, now issued as U.S. Patent 5,424,845.--

UNITED STATES PATENT AND TRADEMARK OFFICE
CERTIFICATE OF CORRECTION

PATENT NO. : 5,440,398
DATED : August 8, 1995
INVENTOR(S) : Holowko et al.

It is certified that error appears in the above-indentified patent and that said Letters Patent is hereby corrected as shown below:

Column 3, line 35, after "order", please insert --to--.

Column 3, line 35, after "enable", please delete "to".

Column 3, line 60, after "Ser. No. 08/022,127", please insert --now issued as U.S. Patent No. 5,424,845.--

Column 4, line 49, after "distance", please delete "betwen", and insert --between-- therefor.

Column 5, line 51, after "light", please delete "call", and insert --cell-- therefor.

Column 9, line 27, after "cell", please delete "60", and insert --606-- therefor.

Column 9, line 28, after "cell", please delete "60", and insert --606-- therefor.

Column 10, line 20, please delete "computer.34", and insert --computer 34-- therefor.

UNITED STATES PATENT AND TRADEMARK OFFICE
CERTIFICATE OF CORRECTION

PATENT NO. : 5,440,398                                              Page 3 of 4
DATED      : August 8, 1995
INVENTOR(S): Holowko et al.

It is certified that error appears in the above-indentified patent and that said Letters Patent is hereby corrected as shown below:

Column 11, line 11, after "block", please delete "186", and insert --182-- therefor.

Column 11, line 29, after "dimensions", please insert --on--.

In claim 3, column 12, line 39, please delete "at least one".

In claim 3, column 12, line 40, please delete "size" and insert --cell-- therefor.

In claim 4, column 12, line 45, please delete "Apparatus" and insert --The gravure engraver-- therefor.

In claim 5, column 12, line 51, please delete "Apparatus" and insert --The gravure engraver-- therefor.

In claim 5, column 12, line 53, before "error", please insert --at least one--.

In claim 6, column 12, line 56, please delete "Apparatus" and insert --The gravure engraver-- therefor.

UNITED STATES PATENT AND TRADEMARK OFFICE
CERTIFICATE OF CORRECTION

PATENT NO. : 5,440,398
DATED : August 8, 1995
INVENTOR(S) : Holowko et al.

It is certified that error appears in the above-indentified patent and that said Letters Patent is hereby corrected as shown below:

In claim 8, column 13, line 11, please delete "A", and insert --The-- therefor.

In claim 9, column 13, line 18, please delete "A", and insert --The-- therefor.

In claim 10, column 13, line 24, please delete "A", and insert --The-- therefor.

In claim 11, column 13, line 31, after "said", please insert --ink--.

In claim 13, column 14, line 20, please delete "A", and insert --The-- therefor.

In claim 14, column 14, line 25, please delete "A", and insert --The-- therefor.

In claim 15, line 30, after "comprising", please insert --:--.

Signed and Sealed this

Eighth Day of July, 1997

BRUCE LEHMAN

Attest:

Attesting Officer

Commissioner of Patents and Trademarks